Nov. 5, 1963     F. L. ARNETT     3,109,669
AUTOMATIC SAFETY LATCH
Filed Oct. 9, 1961
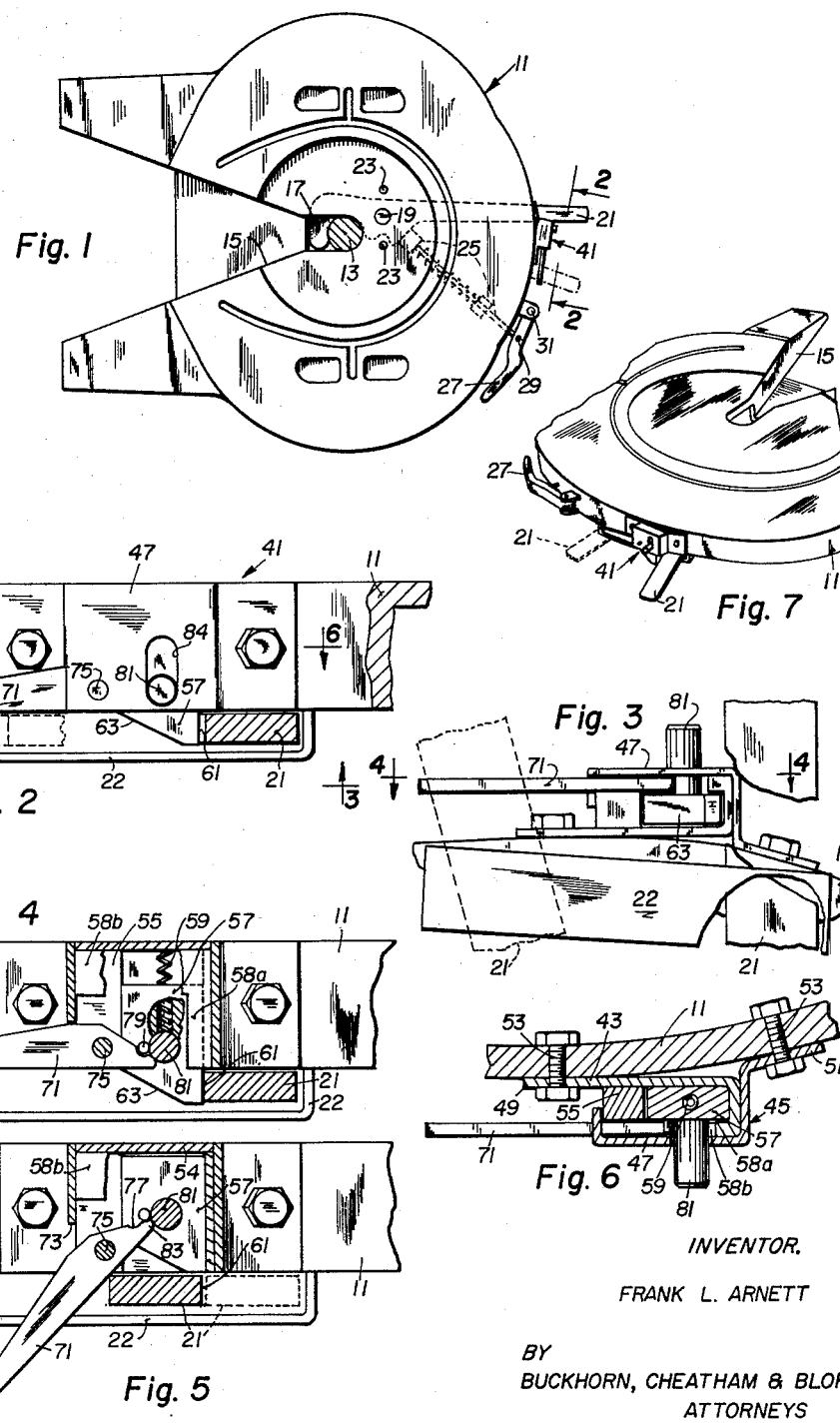
INVENTOR.
FRANK L. ARNETT
BY
BUCKHORN, CHEATHAM & BLORE
ATTORNEYS

United States Patent Office 3,109,669
Patented Nov. 5, 1963

3,109,669
AUTOMATIC SAFETY LATCH
Frank L. Arnett, Rte. 1, Box 85, Oregon City, Oreg.
Filed Oct. 9, 1961, Ser. No. 143,812
6 Claims. (Cl. 280—434)

This invention relates to fifth wheel devices for tractor-trailer rigs and relates particularly to safety mechanism for assuming proper operation of such devices.

Many fifth wheel devices have a projecting handle or similar member for actuating a kingpin latch to permit releasing the kingpin or latching of the same. In such devices, there is one and sometimes two manually operable auxiliary latches for releasably holding the handle in its latching position. One common auxiliary latch engages the kingpin latch locally of the inner end thereof. Another common type that supplements the just-mentioned type comprises a pin or bolt to be passed through matching holes in the kingpin latch handle and a fixed portion of the fifth wheel. This type of arrangement requires that the operator remember to perform one or several manual operations after the rig is connected, and occasionally the driver forgets to do this. When this occurs, there is considerable danger that the rig will become uncoupled while in use, with consequent dangers and damage.

It is a main object of the present invention to provide such a latch arrangement which is automatically operable so that the handle is automatically held in its latching position any time the handle is moved to such position.

Another object is to provide such an automatic latch arrangement which can be manually released, but which has a portion engaged by the handle as the handle is moved from its latching to its releasing position to automatically return such arrangement to its holding or latching position.

A further object is to provide an automatic arrangement as just described wherein the latch arrangement is so related to the handle, that when the handle is in its releasing position, the mentioned portion of said latch arrangement cannot be moved to its operative position, to thus avoid the possibility of damage to said arrangement.

Various other objects of the invention will be apparent from the following description taken in connection with the accompanying drawings wherein:

FIG. 1 is a plan view of a fifth wheel mechanism having a handle latching arrangement of the present invention;

FIG. 2 is a vertical section on an enlarged scale taken in the direction of the arrows 2—2 of FIG. 1;

FIG. 3 is a fragmentary bottom plan view taken in the direction of the arrows 3—3 of FIG. 2;

FIG. 4 is a fragmentary vertical section taken along line 4—4 of FIG. 3 showing the operative position of the handle latch;

FIG. 5 is a view similar to FIG. 4 but showing the inoperative position of the handle latch;

FIG. 6 is a fragmentary horizontal section taken along lines 6—6 of FIG. 2; and

FIG. 7 is a perspective view of part of the fifth wheel mechanism, showing the latching arrangement of the present invention.

Referring to FIG. 1, a conventional fifth wheel mechanism is shown which includes a fifth wheel body or bolster plate generally indicated by the reference numeral 11 attached to a tractor or similar vehicle, not shown. A kingpin 13 for a trailer, not shown, is latched in the front end of the kingpin slot 15 by a main or kingpin latch 17 of conventional form. The latch 17 conventionally assumes the form of a lever. The latch 17 is pivoted at 19 on the fifth wheel body 11 and has a handle 21 projecting forwardly and beyond the fifth wheel body to be accessible for manual operation. Frequently a guide bracket 22 is provided for the handle 21 and is mounted on the fifth wheel body 11. A pair of stops 23 limit the pivotal movement of the main latch between the full line and the broken line positions in FIG. 1. A manually operable auxiliary latch 25 is used to lock the main latch 17 in its operative position and is operated by a lever 27 pivoted at 29 to the auxiliary latch and at 31 to a clevis 33 mounted on the fifth wheel body 11. The pin and hole type latch that frequently supplements the latch just described has not been shown.

The above construction is conventional. An automatic latch of the present invention is provided for the fifth wheel mechanism and is indicated generally by the reference numeral 41 in FIG. 1.

FIGS. 2, 4 and 6 best show the automatic latch which comprises a body made up of two bent sections, an inner section 43 (FIG. 6) and an outer section 45 which have nesting parts defining a housing 47 and other parts defining flanges 49 and 51 which are secured by bolts 53 to the fifth wheel body 11. The housing is open at its bottom but closed by a wall 54 at its upper end. The wall is a bent flange of the section 45.

Fixedly secured within the housing is a guide block 55, and between the block and the remote housing wall is slidably disposed a latch member 57. Inner section 43 has a latch-member-guide flange including a narrow lower portion 58a and a long upper guide portion 58b. A compression spring 59, which is partly recessed in the latch member, urges the member to its lower or operative position. In such position, the handle holding surface 61 (FIG. 2) of the latch is in position to block movement of the kingpin latch handle 21 from its operative full line position to its inoperative or releasing position shown in broken lines.

The latch member 57 has a lower camming surface 63 which is oblique to the surface 21 so that when the camming surface is engaged by the kingpin latch handle 21, the handle will cam the latch member upwardly temporarily to allow the handle to pass, after which the spring 59 will cause the latch member to snap back to its operative holding or latching position.

To release the handle 21, an auxiliary lever having a handle 71 is provided for the automatic latch and extends through a slot 73 (FIG. 5) formed in the housing and is pivoted at 75 on the block 55. For convenience, the auxiliary lever and its handle will be referred to hereinafter as a handle. The handle 71 has a tapered inner end portion formed with a notch or recess 77 (FIGS. 4 and 5) to accommodate a small stud pin 79 fixed to the latch member. The latch member 57 also fixedly carries a large stud pin 81 disposed in a position such that part of it overlies the nose 83 of the handle 71 as is clear from FIG. 5. The stud pin 81 projects through a vertically elongated slot 84 formed in the outer housing wall 85 and serves as a retainer for retaining the latch member 57 within the housing and limiting its downward movement to a position to project the lower end portion out through the lower open end of the housing 47.

The handle 71 is so dimensioned relative to the latch member 57 and its stud pins that when the latch is pivoted from its FIG. 4 position to its FIG. 5 position, its nose 83 cams the latch member upwardly. Just as the nose 83 goes over center, the latch member 57 reaches its uppermost position, with its upper surface touching or disposed very close to the top wall 54 (FIG. 5) of the housing. Just after the nose 83 goes over center, it enters the downwardly facing bight provided by the stud pins 79 and 81. Further pivoted movement of the handle 71 any substantial extent is prevented because further counter-clockwise pivotal movement of the handle 71 causes the nose 83 to cam the small stud pin 79 and thus the latch member upwardly into engagement with the housing wall 85. Thus the handle 71 is releasably held in its FIG. 5 position.

*Operation*

FIG. 2 shows the operative positions of the parts, with the kingpin latch handle 21 in its operative latching position and the handle latch member 57 in its operative latching position relative to the handle 21.

To uncouple the rig which the fifth wheel mechanism connects, the driver pivots the automatic latch handle 71 from its FIG. 4 to its FIG. 5 position, where the handle will stay until moved therefrom. Now the auxiliary latch 25 is released and the kingpin latch handle 21 swung from the full line position in FIGS. 1 and 2 to its broken line position. As is apparent from FIG. 5, soon after the kingpin latch handle 21 passes beneath the latch member holding surface 61, it engages the left-hand portion of the automatic handle 71 to pivot the handle clockwise so that it assumes its FIGS. 2 and 4 position and releases the latch member 57, which returns to its FIGS. 2 and 4 position.

It is pointed out that the left-hand portion of the automatic handle 71 is such that it overlies the kingpin latch handle 21 when the parts are as shown in FIG. 2. This relationship prevents the automatic handle 71 from being inadvertently moved to its FIG. 5 position at a time when the pingpin latch handle 21 is in its FIG. 2 broken line position. The importance of this is realized when it is pointed out that the kingpin latch handle 21 is returned to its latch position by the coupling action of the fifth wheel mechanism. If the automatic latch handle were in the way, it would obviously be damaged.

When the fifth wheel mechanism is again coupled, the kingpin handle 21 will be kicked over by the coupling action to cam the latch member 57 upwardly temporarily to allow the handle 21 to pass beneath it, after which it automatically returns to its lower operative position. It is pointed out that such upward and downward movement of the latch member 57 does not affect the position of the automatic latch handle 71 because frictional forces hold the handle 71 in its FIGS. 2 and 4 position.

Now, with the automatic latch holding the kingpin latch handle 21 in its operative position the rig will remain coupled even though the driver forgets to operate the manual auxiliary latch 25, or any other manually operable auxiliary latch.

Instead of using two stud pins 79 and 81, a single member could be used to provide the downwardly facing bight provided by the pins.

While the automatic latch has been shown applied to a fifth wheel mechanism of one type, the latch could be applied to other fifth wheel mechanisms.

In actual practice, automatic safety latches of my invention have already saved the loss of two trailers. It is thus evident that my safety latch is a real necessity to the truck operator who would suffer considerable loss otherwise.

Having described the invention in what is considered to be the preferred embodiment thereof, it is desired that it be understood that the invention is not to be limited other than by the provisions of the following claims.

I claim:

1. In combination with a fifth wheel mechanism including a fifth wheel having a main latch for a kingpin wherein the latch has a projecting handle movable between a kingpin holding position and a kingpin releasing position;

a latch for said handle mounted on said fifth wheel next to the path of movement of said handle;

said latch having a latch member urged to assume a position in said path of movement to prevent said handle from moving from its holding position to its releasing position;

an actuating element for said latch member operable when moved from a first position to a second position to retract said latch member and operable when moved in the reverse direction to release said latch member for movement to its latching position;

and means for releasably holding said element in such second position;

said element in its operative position having a portion projecting into the path of movement of said handle to be engaged by said handle after said handle has moved beyond the handle holding surface of said latch member so that said latch member is automatically returned to its latching position when said handle moves from its holding to its releasing position.

2. In combination with a fifth wheel mechanism including a fifth wheel having a main latch for a kingpin wherein the latch has a projecting handle movable between a kingpin holding position and a kingpin releasing position;

a latch for said handle mounted on said fifth wheel next to the path of movement of said handle;

said latch having a latch member urged to assume a position in said path of movement to prevent said handle from moving from its holding position to its releasing position;

an actuating element for said latch member operable when moved from a first position to a second position to retract said latch member and operable when moved in the reverse direction to release said latch member for movement to its latching position;

and means for releasably holding said element in such second position;

said element in its operative position having a portion projecting into the path of movement of said handle to be engaged by said handle after said handle has moved beyond the handle holding surface of said latch member so that said latch member is automatically returned to its latching position when said handle moves from its holding to its releasing position;

said latch member having a camming surface engaged by said handle when the handle is returned to its holding position to enable said handle to temporarily move said latch member toward its inoperative position to allow the handle to move past said latch member under the just mentioned circumstances.

3. In combination with a fifth wheel mechanism including a fifth wheel having a main latch for a kingpin wherein the latch has a projecting handle movable between a kingpin holding position and a kingpin releasing position;

a latch for said handle mounted on said fifth wheel next to the path of movement of said handle;

said latch having a latch member urged to assume a position in said path of movement to prevent said handle from moving from its holding position to its releasing position;

an actuating element for said latch member operable when moved from a first position to a second position to retract said latch member and operable when moved in the reverse direction to release said latch member for movement to its latching position;

and means for releasably holding said element in such second position;

said element in its operative position having a portion projecting into the path of movement of said handle to be engaged by said handle after said handle has moved beyond the handle holding surface of said latch member so that said latch member is automatically returned to its latching position when said handle moves from its holding to its releasing position;

said element having a portion whose path of movement passes through the releasing position of said handle so that said element cannot be moved from its first position to its second position at a time when the handle is in its releasing position.

4. In combination with a fifth wheel mechanism including a fifth wheel having a main latch for a kingpin wherein the latch has a projecting handle movable between a kingpin holding position and a kingpin releasing position;

a latch for said handle mounted on said fifth wheel next to the path of movement of said handle;

said latch having a latch member urged to assume a position in said path for movement to prevent said handle from moving from its holding position to its releasing position;

an actuating element for said latch member operable when moved from a first position to a second position to retract said latch member and operable when moved in the reverse direction to release said latch member for movement to its latching position;

and means for releasably holding said element in such second position;

said element in its operative position having a portion projecting into the path of movement of said handle to be engaged by said handle after said handle has moved beyond the handle holding surface of said latch member so that said latch member is automatically returned to its latching position when said handle moves from its holding to its releasing position;

said element having a portion whose path of movement passes through the releasing position of said handle so that said element cannot be moved from its first position to its second position at a time when the handle is in its releasing position;

said latch member having a camming surface engaged by said handle when the handle is returned to its holding position to enable said handle to temporarily move said latch member toward its inoperative position to allow the handle to move past said latch member under the just mentioned circumstances.

5. A latch unit for a fifth wheel mechanism of the type having a tractor bolster plate to engage a trailer kingpin, wherein there is a latch for the kingpin comprising a main lever mounted on said bolster plate for horizontal swinging movement from a latching position in which said kingpin is latched to said bolster plate to a releasing position in which said kingpin is released, and back to said latching position to complete a cycle of operation, and wherein said main lever has a handle projecting beyond the periphery of said bolster plate, said latch unit including a body, means for mounting said body on the peripheral surface of said bolster plate in a position vertically offset from but adjacent to the path of travel of said main lever handle, a latch member mounted on said body for vertical movement and having a lower position in which it blocks the movement of said main lever handle from its latching to its releasing position, said latch member having a raised position in which it releases said main lever handle for movement from its latching to its releasing position, said unit including an auxiliary lever for raising said latch member and having an overcenter action with said latch member to releasably retain said latch member raised, said auxiliary lever in its overcenter position having a portion projecting into the path of travel of said main lever handle to be engaged by said main lever handle during movement of said main lever handle from its latching to its releasing position to move said auxiliary lever from its overcenter position to release said latch member for return to its lowered position.

6. A latch unit for a fifth wheel mechanism of the type having a tractor bolster plate to engage a trailer kingpin, wherein there is a latch for the kingpin comprising a main lever mounted on said bolster plate for horizontal swinging movement from a latching position in which said kingpin is latched to said bolster plate to a releasing position in which said kingpin is released, and back to said latching position to complete a cycle of operation, and wherein said main lever has a handle projecting beyond the periphery of said bolster plate, said latch unit including a body, means for mounting said body on the peripheral surface of said bolster plate in a position vertically offset from but adjacent to the path of travel of said main lever handle, a latch member mounted on said body for vertical movement and having a lower position in which it blocks the movement of said main lever handle from its latching to its releasing position, said latch member having a raised position in which it releases said main lever handle from movement from its latching to its releasing position, said unit including an auxiliary lever for raising said latch member and having an overcenter action with said latch member to releasably retain said latch member raised, said auxiliary lever in its overcenter position having a portion projecting into the path of travel of said main lever handle to be engaged by said main lever handle during movement of said main lever handle from its latching to its releasing position to move said auxiliary lever from its overcenter position to release said latch member for return to its lowered position, spring means urging said latch member toward its lower position so that said latch member assumes its lower position when said auxiliary lever is moved from its overcenter position, said latch member having a camming surface facing the releasing position of said main lever handle to enable said main lever handle to temporarily raise said latch member when said main lever is returned from its releasing to its latching position.

References Cited in the file of this patent

UNITED STATES PATENTS

| | | |
|---|---|---|
| 1,941,682 | Gurton | Jan. 2, 1934 |
| 2,170,898 | Humphrey | Aug. 29, 1939 |
| 2,623,753 | Madigan | Dec. 30, 1952 |
| 2,811,374 | Fuschi | Oct. 29, 1957 |
| 2,828,972 | Fuschi | Apr. 1, 1958 |